J. R. APPLEGATE.
MACHINE FOR ENCASING POCKET PORTRAITS.
No. 189,167. Patented April 3, 1877.
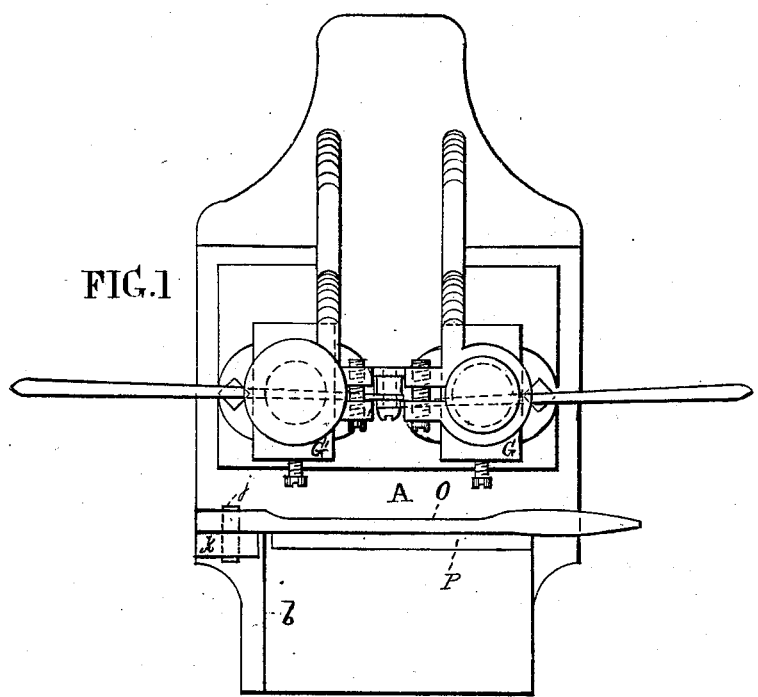
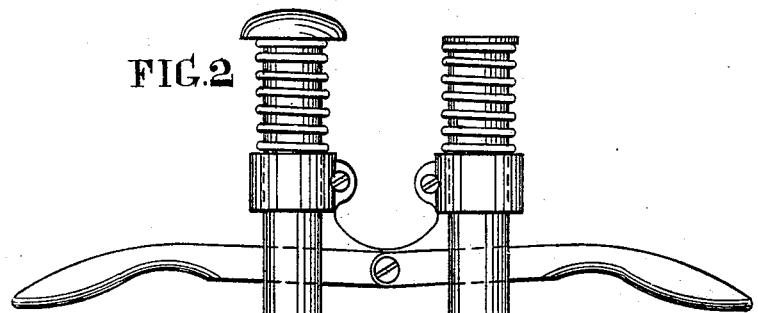
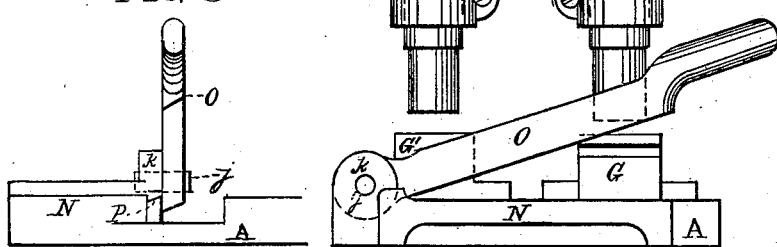

UNITED STATES PATENT OFFICE.

JAMES R. APPLEGATE, OF PHILADELPHIA, PENNSYLVANIA.

IMPROVEMENT IN MACHINES FOR INCASING POCKET-PORTRAITS.

Specification forming part of Letters Patent No. 189,167, dated April 3, 1877; application filed October 28, 1876.

*To all whom it may concern:*

Be it known that I, JAMES R. APPLEGATE, of the city and county of Philadelphia, in the State of Pennsylvania, have invented a new and useful Improvement in Machines for Punching and Incasing Pocket - Portraits, which improvement is fully set forth in the following specification, reference being had to the accompanying drawings.

My invention relates to an improvement on the machine for which Letters Patent were granted to me on the 13th day of June, 1876, No. 178,706.

The object of this invention is to provide a machine constructed to punch and incase portraits, with shears arranged relatively to the punching and incasing dies, whereby the scrap material left on the edge of the sheet may be accurately and quickly severed from the main body of the sheet.

My invention consists in an organized machine, consisting essentially of a cutting-die and punch, sealing-dies and shears, the several parts being relatively arranged on the same bed - plate, in such a manner that the sheet having portraits formed thereon may be successively punched and the scrap material trimmed or cut therefrom by means of the cutting-punches and shears, and then the portraits may be sealed by means of the sealing-dies, whereby the necessary operations for forming pocket-portraits may be performed on a single machine.

In the drawings, Figure 1 is a plan view of my improved machine. Fig. 2 is a front elevation of the same, and Fig. 3 represents an edge view of the shear-table and bed-plate.

A represents the bed-plate, having the cutting-die G arranged on one side of the same, and on the other side is secured the incasing or sealing die G′, which parts are constructed to operate in the manner described in my patent above set forth.

The forward end of bed-plate A has a shear-table, N, cast solid therewith, or formed separate and attached by a rabbet in the bed-plate, and riveted to the same, as illustrated in Fig. 3.

A stationary shear, P, is firmly secured, by screws or in any desired manner, to the forward edge of table N, while a movable cutter or shear is pivoted to the lug or bearing K, formed on table N, by means of a bearing-pin, *j*. Table N is combined with the bed-plate A in such a manner that the upper surface of the table shall be lower than the surface of the sealing or cutting dies, and therefore not interfere with the operator as the portraits are being punched or incased.

The operation is as follows: A sheet, having any number of rows of portraits formed thereon, is placed upon the cutting-die G, and a row of portraits punched from the sheet. The scrap material left on the edge of the sheet from which the portraits have been punched is then severed from the main body of the sheet by means of the shear O N. The sheet is forced against guide *b*, which is formed at right angles to the cutting-edge of the shears, and moved forward a sufficient distance between the parts O N, so that the latter, when operated, serve to cut the scrap material from the sheet. Another row of portraits may be then punched from the sheet, and the scrap trimmed therefrom, in the manner above set forth.

A machine constructed in accordance with my invention is especially adapted for use by photographers of limited means, as all the appliances and mechanism necessary to manufacture complete merchantable pocket - portraits are combined in a single organized machine of simple and durable construction, and adapted to be furnished at a small initial cost.

Having fully described my invention, what I claim as new, and desire to secure by Letters Patent, is—

In a machine for punching and incasing pocket-portraits, the cutting-die G, the sealing-die G′, and shear N O, jointly, the several parts attached to a single bed-plate, and arranged for successive operation, substantially as and for the purpose set forth.

JAMES R. APPLEGATE.

Witnesses:
THOMAS J. BEWLEY,
P. V. WEAVER.